United States Patent
Fujishima et al.

(10) Patent No.: US 6,371,515 B1
(45) Date of Patent: Apr. 16, 2002

(54) ACTIVATION CONTROL APPARATUS OF OCCUPANT SAFETY SYSTEM

(75) Inventors: Hiromichi Fujishima; Masahide Sawada, both of Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/445,032

(22) PCT Filed: Apr. 1, 1999

(86) PCT No.: PCT/JP99/01733

§ 371 Date: Dec. 1, 1999

§ 102(e) Date: Dec. 1, 1999

(87) PCT Pub. No.: WO99/51468

PCT Pub. Date: Oct. 14, 1999

(30) Foreign Application Priority Data

Apr. 2, 1998 (JP) .......................................... 10-090101

(51) Int. Cl.[7] ............................................... B60R 21/32
(52) U.S. Cl. ........................ 280/735; 180/282; 701/45
(58) Field of Search .................... 280/735; 180/282; 701/46, 47, 45

(56) References Cited

U.S. PATENT DOCUMENTS

| | | | |
|---|---|---|---|
| 5,014,810 A | 5/1991 | Mattes et al. ................ 180/268 |
| 5,407,228 A | 4/1995 | Shibata et al. ............... 280/735 |
| 5,496,979 A | 3/1996 | Behr ......................... 200/61.45 |
| 5,559,697 A | 9/1996 | Wang ..................... 364/424.05 |
| 5,668,720 A | 9/1997 | Takahashi et al. ............. 701/46 |
| 5,785,347 A | 7/1998 | Adolph et al. ............... 280/735 |
| 5,815,393 A | 9/1998 | Chae ................... 364/424.056 |
| 5,914,653 A | * 6/1999 | Takeuchi et al. ............. 340/436 |
| 5,936,518 A | 8/1999 | Fukui et al. ................. 340/436 |
| 5,961,562 A | * 10/1999 | Iyoda ............................ 701/45 |
| 5,967,548 A | 10/1999 | Kozyreff ...................... 280/735 |
| 5,969,599 A | 10/1999 | Wessels et al. .............. 340/436 |
| 5,978,722 A | 11/1999 | Takasuka et al. .............. 701/45 |
| 5,995,892 A | * 11/1999 | Kiribayahi et al. ............ 701/45 |
| 6,023,664 A | * 2/2000 | Bennet ........................ 702/141 |
| 6,236,922 B1 | * 5/2001 | Andres ......................... 701/45 |

FOREIGN PATENT DOCUMENTS

| | | |
|---|---|---|
| JP | 04-072060 | 6/1992 |
| JP | 05-213150 | 8/1993 |
| JP | 05-213153 | 8/1993 |
| JP | 05-305855 | 11/1993 |
| JP | 06-321051 | 11/1994 |
| JP | 06-340244 | 12/1994 |
| JP | 07-309197 | 11/1995 |
| JP | 10-152014 | 6/1998 |

OTHER PUBLICATIONS

Abstract of JP 5-65706, Aug. 31, 1993, Suzuki Motor Corp.

* cited by examiner

*Primary Examiner*—Kenneth R. Rice
*Assistant Examiner*—Christopher Buchanan
(74) *Attorney, Agent, or Firm*—Kenyon & Kenyon

(57) ABSTRACT

An activation control apparatus of an occupant safety system has a floor sensor 32 disposed at a predetermined position in a vehicle and arranged to detect impact on the vehicle and an activation control 40 of the occupant safety system for activating the occupant safety system when an operation value obtained based on a detection value detected by the floor sensor 32 exceeds a predetermined threshold, and the activation control apparatus further has satellite sensors 30A, 30B disposed more to the front than the floor sensor 32 in the vehicle and arranged to detect a level of the impact on the vehicle to detect values of at least two different magnitudes according to the level of the detected impact, and a threshold changer 42 for changing the predetermined threshold in accordance with a detection value of the satellite sensors 30A, 30B.

12 Claims, 13 Drawing Sheets

FRONTAL CRASH

OBLIQUE CRASH

POLE CRASH

OFFSET CRASH

UNDER-RIDE CRASH

RUNNING ON ROUGH ROAD

ACTIVATION CONTROL APPARATUS OF OCCUPANT SAFETY SYSTEM

TECHNICAL FIELD

The present invention relates to an activation control apparatus of an occupant safety system for controlling activation of the occupant safety system such as an airbag system or the like for protecting occupants in a vehicle in the event of a vehicle collision.

BACKGROUND ART

The conventional activation control apparatus for controlling the activation of the occupant safety system is designed to detect impact on the vehicle by measuring deceleration with an acceleration sensor normally mounted on the floor tunnel, compute an operation value based on the deceleration thus detected, compare the operation value with a preset threshold, and control firing of squib, based on the result of the comparison.

Here vehicle crash types are classified under frontal crash, oblique crash, pole crash, offset crash, under-ride crash, etc., as illustrated in FIG. 14A to FIG. 14F, according to the way of collision, the direction of collision, the type of a colliding object, and so on. In the event of the frontal crash out of them, because the vehicle is designed to absorb the impact upon crash by the two left and right side members, great deceleration appears on the floor tunnel, on which the floor sensor is mounted, in a predetermined time after the crash. In contrast with it, in the event of the crash except for the frontal crash, because the way of absorbing the impact is different from such impact absorption, the deceleration is not so great on the floor tunnel in the predetermined time after the crash.

In order to detect the crash except for the frontal crash, it is, therefore, necessary to place a sensor other than the floor sensor in the front part of the vehicle so as to accurately detect the impact upon the crash except for the frontal crash.

An object of the present invention is to provide an activation control apparatus of an occupant safety system capable of activating the occupant safety system at optimum timing.

DISCLOSURE OF INVENTION

The present invention provides an activation control apparatus of an occupant safety system comprising a first sensor disposed at a predetermined position in a vehicle, for detecting impact on the vehicle, activation control means of the occupant safety system for activating the occupant safety system when an operation value obtained based on a detection value detected by the first sensor exceeds a predetermined threshold, a second sensor disposed more to the front than said first sensor in the vehicle, for detecting a level of impact on the vehicle to detect values of at least two different magnitudes according to the level of the impact detected, and threshold changing means for changing the predetermined threshold according to a detection value of the second sensor, wherein the threshold changing means comprises threshold change amount increasing means for increasing a change amount of the predetermined threshold with increase in a value based on the detection value of the second sensor.

The present invention is also characterized in that the value based on the detection value of the second sensor is a value resulting from integration of the detection value of the second sensor over a predetermined duration.

The present invention is also characterized in that the threshold change amount increasing means is arranged to subtract a value based on an operation value resulting from the integration of the detection value of the second sensor over a predetermined duration, from the predetermined threshold.

The present invention is also characterized in that the operation value obtained based on the detection value of the first sensor is a value resulting from the integration of detection value of the first sensor over a predetermined duration.

The present invention is also characterized in that the second sensor is comprised of two sensors and the greater out of detection values detected by the two sensors is defined as the detection value of the second sensor.

The present invention is also characterized in that the second sensor is located in a front center part of the vehicle.

The present invention is also characterized in that the second sensor is arranged to detect levels of the impact on the vehicle and output detection values thereof as linear values.

The present invention is also characterized in that the second sensor is a mechanical sensor which detects levels of the impact on the vehicle and which outputs detection values thereof as values of two different kinds.

According to the present invention, the threshold changing means changes the predetermined threshold used for activation judgment of the occupant safety system in accordance with the detection value of the second sensor and the threshold change amount increasing means increases the change amount of the predetermined threshold used for the activation judgment of the occupant safety system with increase in the detection value of the second sensor; therefore, the occupant safety system can be activated at optimum timing.

The present invention is also characterized in that the threshold changing means comprises threshold change amount decreasing means for decreasing the change amount of the predetermined threshold corresponding to an initial increase state of the operation value based on the detection value of the first sensor.

According to the present invention, the threshold change amount decreasing means decreases the change amount of the predetermined threshold corresponding to the initial increase state of the operation value based on the detection value of the first sensor; therefore, the occupant safety system can be prevented from undergoing oversensitive activation due to the impact etc. during vehicle running on rough roads.

The present invention is also characterized in that the threshold changing means is arranged not to change the predetermined threshold corresponding to the initial increase state of the operation value based on the detection value of the first sensor when the operation value based on the detection value of the second sensor exceeds a predetermined value.

According to the present invention, a change start time of the predetermined threshold can be delayed, because the threshold changing means is arranged not to change the predetermined threshold corresponding to the initial increase state of the operation value based on the detection value of the first sensor when the operation value based on the detection value of the second sensor exceeds the predetermined value; therefore, the occupant safety system can be prevented from undergoing oversensitive activation due to the impact etc. during vehicle running on rough roads.

The present invention is also characterized in that the second sensor comprises a right sensor and a left sensor placed right and left in the front part of the vehicle and the threshold changing means changes the predetermined threshold in accordance with magnitude of a difference between impacts detected by the right sensor and by the left sensor.

According to the present invention, the threshold changing means changes the predetermined threshold used for the activation judgment of the occupant safety system in accordance with the magnitude of the difference between the impacts detected by the right sensor and by the left sensor. Since the magnitude of the difference between the impacts detected by the right sensor and by the left sensor differs depending upon the crash part of the vehicle, the optimum activation control of the occupant safety system can be carried out according to the crash part of the vehicle by changing the predetermined threshold in accordance with the magnitude of the difference between the impacts detected by the right sensor and by the left sensor.

The present invention is also characterized in that the second sensor comprises a right sensor and a left sensor placed right and left in the front part of the vehicle and the threshold changing means changes the predetermined threshold in accordance with magnitude of a difference between the impacts detected by the right sensor and by the left sensor or a ratio of the impacts detected by the right sensor and by the left sensor.

According to the present invention, the optimum activation control of the occupant safety system can be carried out according to the crash part of the vehicle, because the threshold changing means changes the predetermined threshold in accordance with the magnitude of the difference between the impacts detected by the right sensor and by the left sensor or the ratio of the impacts detected by the right sensor and by the left sensor.

BEST MODE FOR CARRYING OUT THE INVENTION

Figure 1:
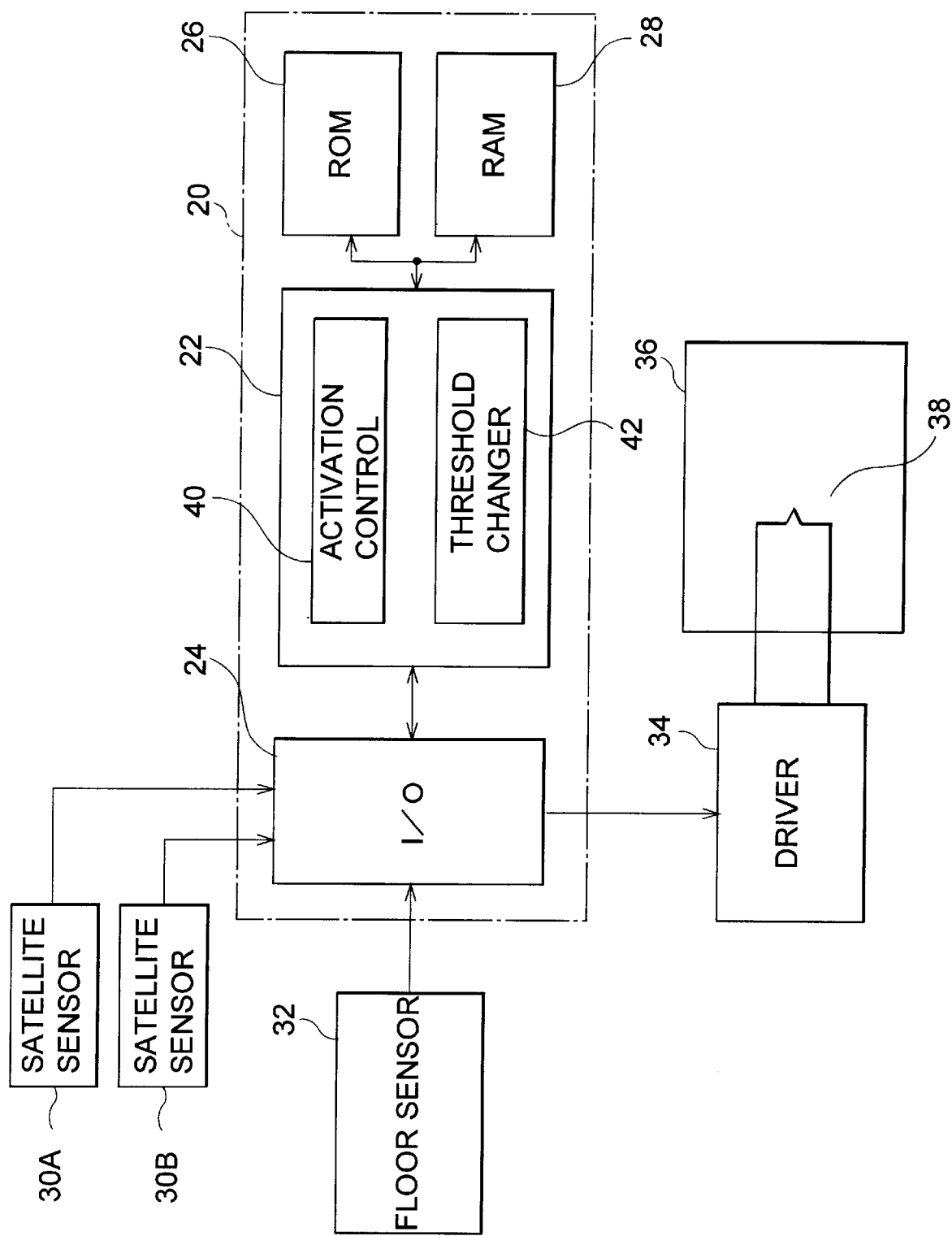
FIG. 1 is a block diagram to show the activation control apparatus of the occupant safety system according to the first embodiment.
Figure 2:
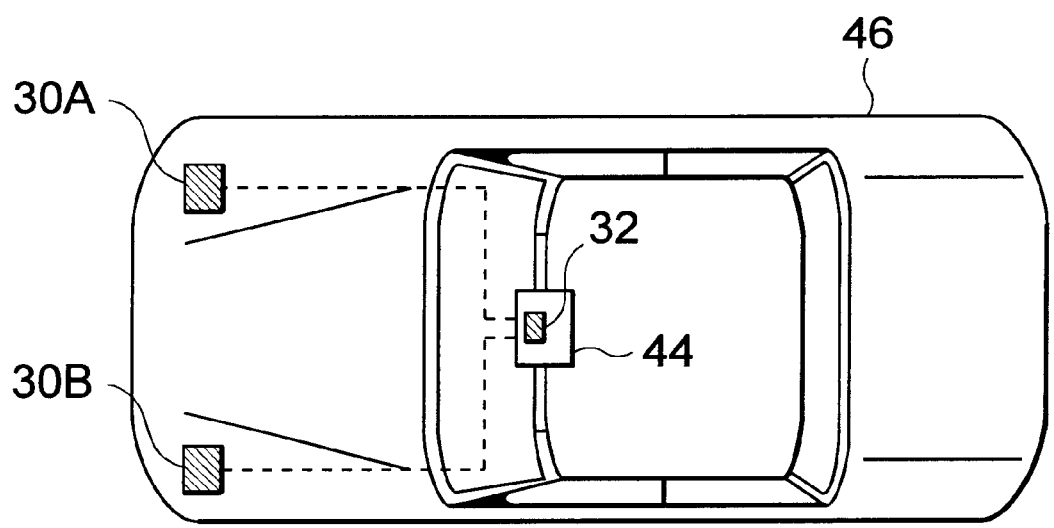
FIG. 2 is an explanatory diagram to show locations of satellite sensors and a floor sensor in the activation control apparatus of the occupant safety system according to the first embodiment.

The activation control apparatus of the occupant safety system according to the first embodiment of the present invention will be described with reference to FIG. 1 to FIG. 5. FIG. 1 is a block diagram to show the activation control apparatus of the occupant safety system using satellite sensors and FIG. 2 is an explanatory diagram to show locations of the satellite sensors and the floor sensor in FIG. 1.

This activation control apparatus of the occupant safety system is a device for controlling triggering of an airbag system 36, which is one of occupant safety systems, and it is provided, as illustrated in FIG. 1, mainly with a control circuit 20, the satellite sensors (second sensor) 30A, 30B, the floor sensor (first sensor) 32, and a driving circuit 34.

Among these, the satellite sensors 30A, 30B are electronic sensors for detecting the magnitude of impact exerted on the vehicle 46; specifically, they detect the deceleration exerted on the vehicle 46 and output a detection signal according to the magnitude of the deceleration detected. The floor sensor 32 is a so-called acceleration sensor for measuring the impact on the vehicle 46; specifically, it measures the deceleration in the longitudinal direction of the vehicle 46 as occasion arises, and it outputs a measured value thereof as a measurement signal.

The control circuit 20 incorporates a central processing unit (CPU) 22, a read-only memory (ROM) 26, a random-access memory (RAM) 28, and an input/output circuit (I/O circuit) 24, and the components are connected via a bus. Among them, the CPU 22 carries out the control of activation of the airbag system 36 in accordance with a program stored in the ROM 26. The RAM 28 is a memory for storing data obtained based on the signals from the respective sensors 30A, 30B, 32 and the result of computation executed based thereon by the CPU 22. The I/O circuit 24 is a circuit for input of the signals from the respective sensors 30A, 30B, 32 and for output of an activation signal to the driving circuit 34.

The CPU 22 functions as an activation control 40 which compares a value obtained based on the result of measurement of the floor sensor 32 with a predetermined threshold and which controls the activation of the airbag system 36, based on the result of the comparison and as a threshold changer 42 which changes the threshold, depending upon the magnitude of the impact detected by the satellite sensors 30A, 30B, in accordance with programs stored in the ROM 26 and the like.

The driving circuit 34 is a circuit which energizes a squib 38 in the airbag system 36 by an activation signal from the control circuit 20 to achieve firing. On the other hand, the airbag system 36 is equipped with a gas generator (not illustrated) to be fired by the squib 38, a bag (not illustrated) to be inflated by evolving gas, and so on, in addition to the squib 38 being a firing unit.

Among these components, the control circuit 20, floor sensor 32, and driving circuit 34 are housed in an ECU (electronic control unit) 44 illustrated in FIG. 2, to be mounted on the floor tunnel located approximately at the center in the vehicle 46. The satellite sensors 30A, 30B are located in the front part of the vehicle 46 obliquely right front and obliquely left front with respect to the floor sensor 32 in the ECU 44, as illustrated in FIG. 2.

Figure 3:
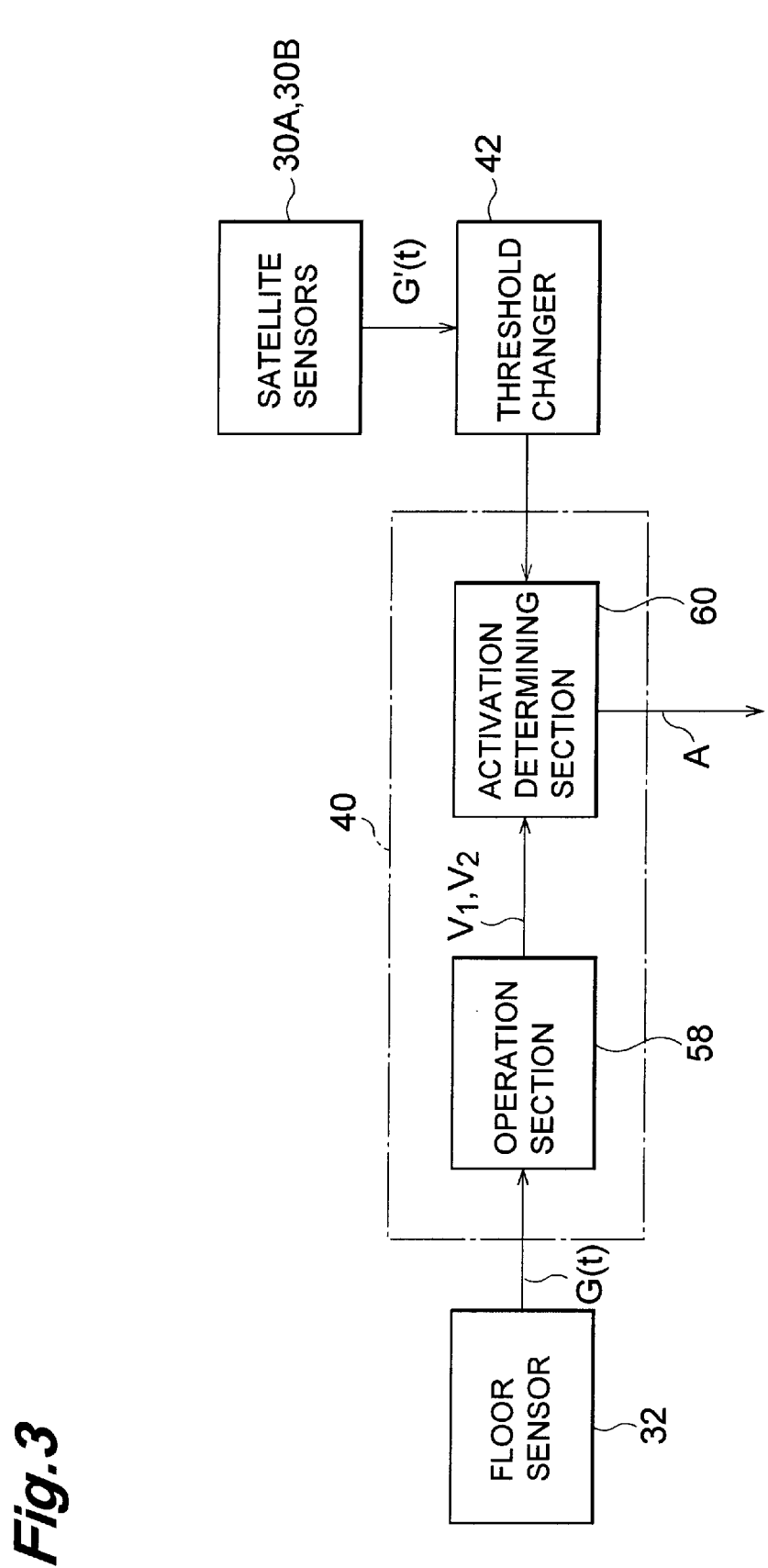
FIG. 3 is a diagram for explaining the operation of the satellite sensors, the floor sensor, CPU, etc. in the activation control apparatus of the occupant safety system according to the first embodiment.

Next described are the operations of the satellite sensors 30A, 30B, the floor sensor 32, and the CPU 22 in the event of the vehicle collision. FIG. 3 is an explanatory diagram for explaining the operations of the satellite sensors 30A, 30B, the floor sensor 32, and the CPU 22 illustrated in FIG. 1. As illustrated in FIG. 3, the activation control 40 in the CPU 22 is provided with an operation section 58 and an activation determining section 60.

The floor sensor 32 measures the deceleration in the longitudinal direction on the vehicle 46 as occasion arises, and it outputs the deceleration as a measurement signal G(t). The operation section 58 of the activation control 40 subjects the measurement value G(t) outputted from the floor sensor 32 to predetermined arithmetic operations, i.e., arithmetic operations according to Eq. 1 and Eq. 2 to obtain operation values $V_1$, $V_2$. These operation values $V_1$, $V_2$ are inputted into the activation determining section 60 and a value defined by the operation values $V_1$, $V_2$ is compared with the threshold $V_n$ of the determination map stored in the threshold changer 42.

$$V_1 = \int_{t-150ms} G(t)dt \quad \text{(Eq. 1)}$$

G(t): output of the floor sensor $$V_2 = \int_{t-10ms} G(t)dt \quad \text{(Eq. 2)}$$

G(t): output of the floor sensor

Figure 4:
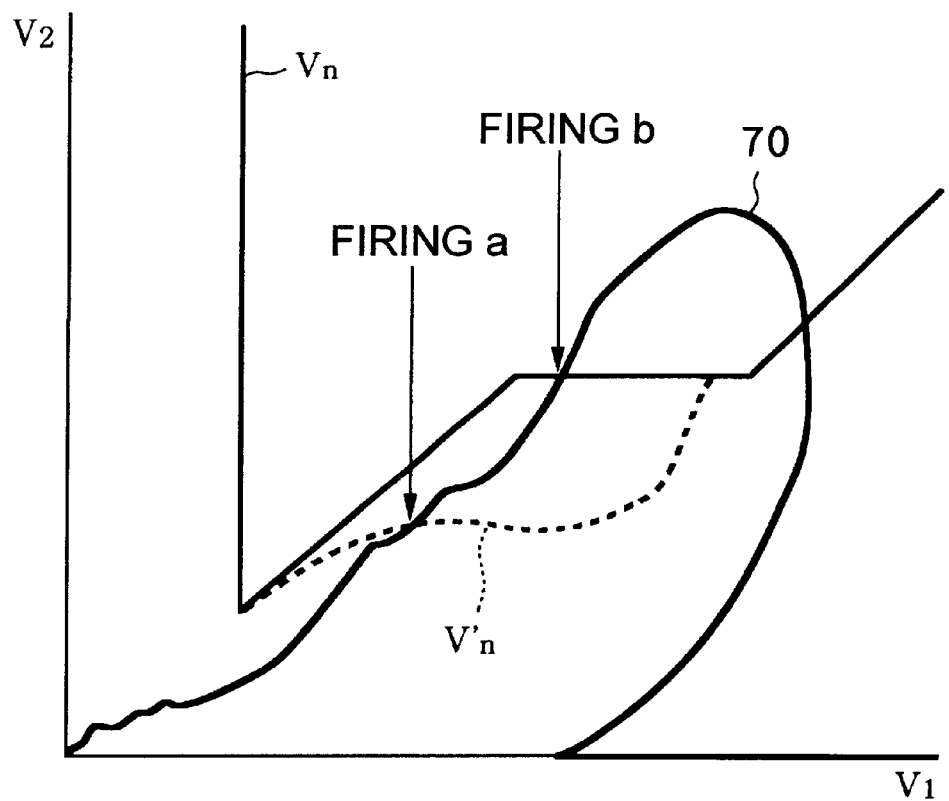
FIG. 4 is a diagram to show a determination map used in the activation control apparatus of the occupant safety system according to the first embodiment.

Namely, the threshold changer 42 stores the determination map having the threshold $V_n$ as illustrated in FIG. 4. This determination map is one in which measurement values $V_1$ are plotted along the axis of abscissas while measurement values $V_2$ along the axis of ordinates. The threshold $V_n$ is set to values larger than values of the impact on the vehicle 46 at a level too low to activate the airbag system in the event of the frontal crash and than those during running of the vehicle 46 on rough roads. Namely, the threshold $V_n$ is determined by first drawing a plurality of curves indicating changes of the operation values $V_1$, $V_2$ is cases where the airbag system 36 does not have to be activated, and then defining a pattern whose values are greater than these curves but are as close to these curves as possible. Specifically, an envelope of these curves is obtained to be defined as the threshold $V_n$.

Figure 5:
FIG. 5 is a graph to show values detected by the satellite sensors in the activation control apparatus of the occupant safety system according to the first embodiment.

The threshold changer 42 accepts input of detection value G'(t) from the satellite sensors 30A, 30B and carries out an arithmetic operation of Eq. 3 using this detection value G'(t) to obtain an operation value $V_3$. The threshold changer 42 changes the threshold $V_n$ to threshold $V'_n$ according to Eq. 4. Namely, the relation between the operation value $V_1$ and the operation value $V_3$ is illustrated in the graph of FIG. 5, and the threshold $V_n$ illustrated in FIG. 4 is changed to the threshold $V'_n$ while a decrease amount of the threshold is calculated according to the magnitude of the operation value $V_3$. The detection value G'(t) from the satellite sensors 30A, 30B is the greater out of a value detected by the satellite sensor 30A and a value detected by the satellite sensor 30B.

$$V_3 = \int_{t-10ms} G'(t)dt \quad \text{(Eq. 3)}$$

G'(t): output of the satellite sensor $$V'_n = V_n - V_3/\alpha \quad \text{(Eq. 4)}$$

α: constant

Therefore, when the threshold $V_n$ is changed to the threshold $V'_n$, based on the detection value G'(t) from the satellite sensors 30A, 30B, the activation determining section 60 acquires the threshold $V'_n$ from the threshold changer 42 and compares the value defined by the operation values $V_1$, $V_2$ obtained in the operation section 58 with the threshold $V'_n$. When the value defined by the operation values $V_1$, $V_2$ exceeds the threshold $V'_n$, the activation determining section 60 outputs an activation signal A to the driving circuit 34 (see FIG. 1). This causes the driving circuit 34 to energize the squib 38 in order to activate the airbag system 36, whereupon the squib 38 fires the gas generator (not illustrated).

With the activation control apparatus of the occupant safety system according to this first embodiment, where values defined by the operation values $V_1$, $V_2$ based on the deceleration G(t) measured by the floor sensor 32 vary as indicated by a solid line 70 of FIG. 4, the airbag system 36 can be activated at the time of firing a. Namely, if the activation determination is made using the threshold $V_n$, the airbag system 36 will be activated at the time of firing b; whereas the airbag system 36 can be activated at the time of firing a earlier than the time of firing b, because the threshold $V_n$ is changed to the threshold $V'_n$ in accordance with the magnitude of the operation value $V_3$. The airbag system 36 can be activated at the optimum timing according to the magnitude of impact, i.e., at the earlier timing with great impact accordingly.

The first embodiment is provided with the satellite sensors 30A, 30B left and right in the front part of the vehicle, but another conceivable configuration can be such that only one satellite sensor is located at the center in the front part of the vehicle.

The satellite sensors 30A, 30B in the first embodiment can be any sensors capable of detecting two or more different values and can be sensors that linearly detect values based on the magnitude of applied impact or mechanical sensors or the like capable of detecting the magnitude of impact of two different kinds. The sensors capable of linearly detecting values herein can be any sensors selected from electronic, semiconductor, diaphragm, and capacitive acceleration (deceleration) sensors and the like, and may also be various load sensors which detect the magnitude of a load applied.

The activation signal outputted from the activation determining section 60 may also be used as an activation signal for door lock release, fuel cut, emission of an urgent notice in the event of an accident, and so on. In this case the reliability of the activation signal can be enhanced by use of the signal from the satellite sensors 30A, 30B for the judgment of output of the activation signal.

The activation control apparatus of the occupant safety system according to the second embodiment of the present invention will be described next referring to FIG. 6A to FIG. 7B. The structure of the activation control apparatus of the occupant safety system is the same as that of the activation control apparatus of the occupant safety system according to the first embodiment (see FIG. 1 and FIG. 3), but the apparatus of the present embodiment is arranged to carry out such control as to vary the change amount of the threshold according to the crash type.

Figure 6A:
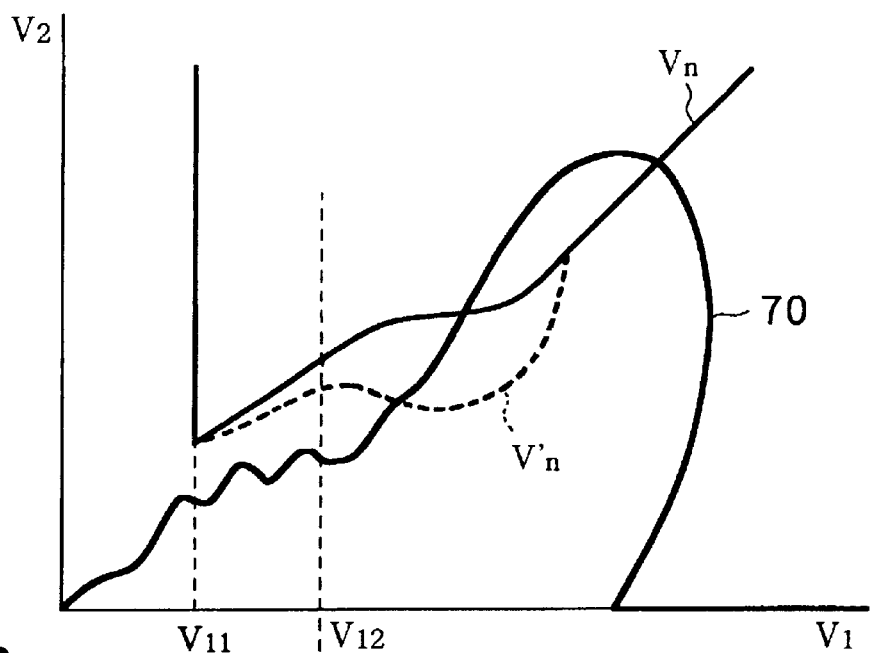
FIG. 6A is a diagram to show a determination map used in the activation control apparatus of the occupant safety system according to the second embodiment, and values detected upon collision by the floor sensors.
Figure 7A:
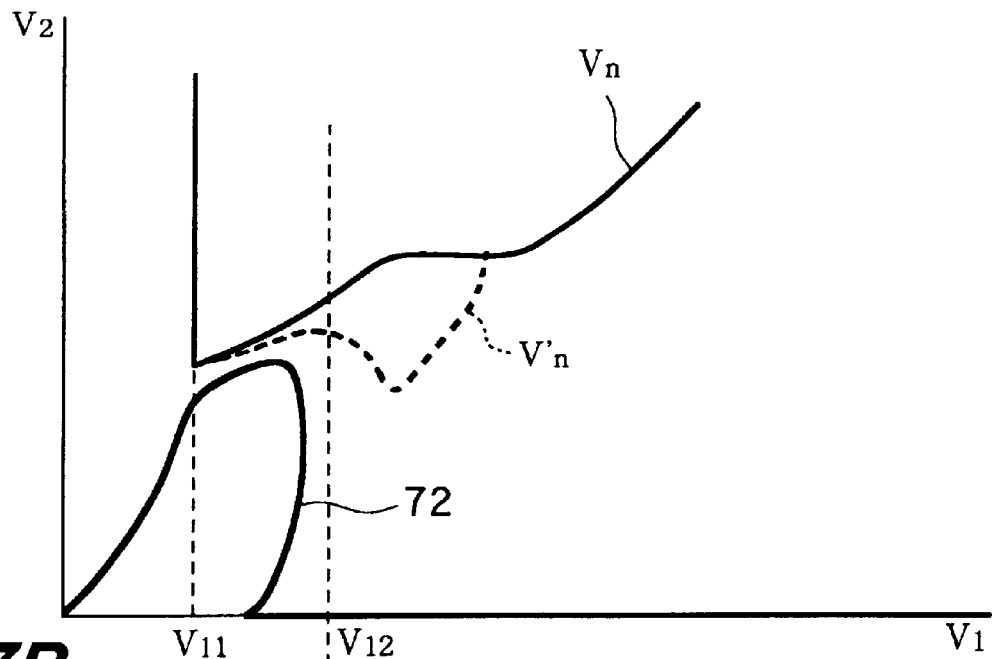
FIG. 7A is a diagram to show a determination map used in the activation control apparatus of the occupant safety system according to the second embodiment, and values detected during vehicle running on rough roads by the floor sensors.

FIG. 6A is a diagram to show the determination map having the threshold $V_n$ stored in the threshold changer 42 and a solid line 70 thereon which represents change in the value defined by the operation values $V_1$, $V_2$ based on the measurement value G(t) of the floor sensor 32 upon the collision. FIG. 7A is a diagram to show the determination map having the threshold $V_n$ stored in the threshold changer 42 and a solid line 72 thereon which represents change in the value defined by the operation values $V_1$, $V_2$ based on the measurement value G(t) of the floor sensor 32 during running on rough roads and upon an under hit during running. The threshold $V_n$ stored in the threshold changer 42 is the same as the threshold $V_n$ in the first embodiment and the operation values $V_1$ and $V_2$ are those computed according to the same equations as in the first embodiment.

In this activation control apparatus of the occupant safety system according to the second embodiment, in the range of $V_{12}<V_1$ the threshold $V_n$ is changed to the threshold $V'_n$ according to Eq. 4, as in the case of the first embodiment, but in the range of $V_{11}<V_1<V_{12}$ the threshold $V_n$ is changed to the threshold $V'_n$ according to Eq. 5 (see FIG. 6A).

$$V'_n = V_n - V_3/\alpha'[V_{11}<V_1<V_{12}]\alpha'>\alpha \quad \text{(Eq. 5)}$$

$\alpha$: constant, $\alpha'$: constant

Figure 6B:
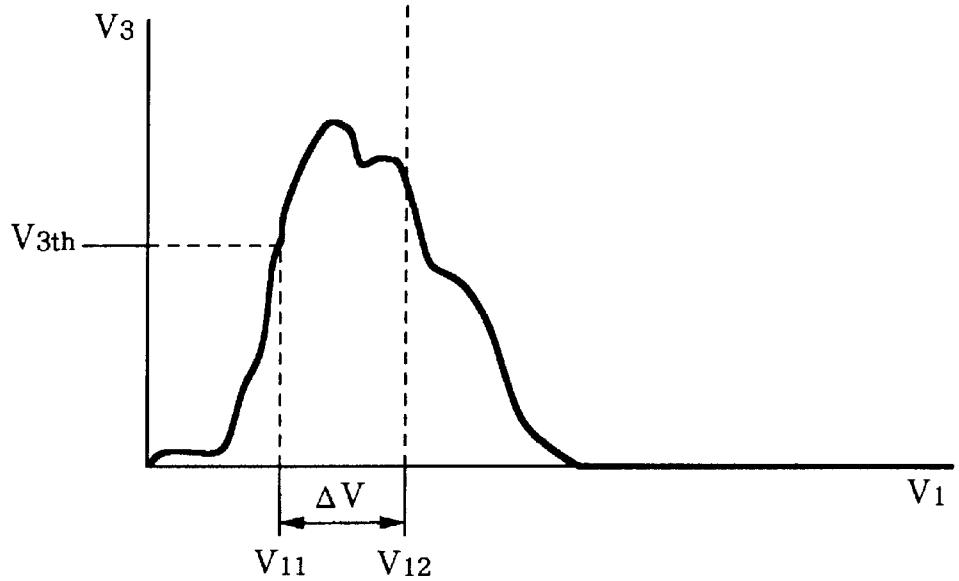
FIG. 6B is a graph to show values detected by the satellite sensors in the activation control apparatus of the occupant safety system according to the second embodiment.
Figure 7B:
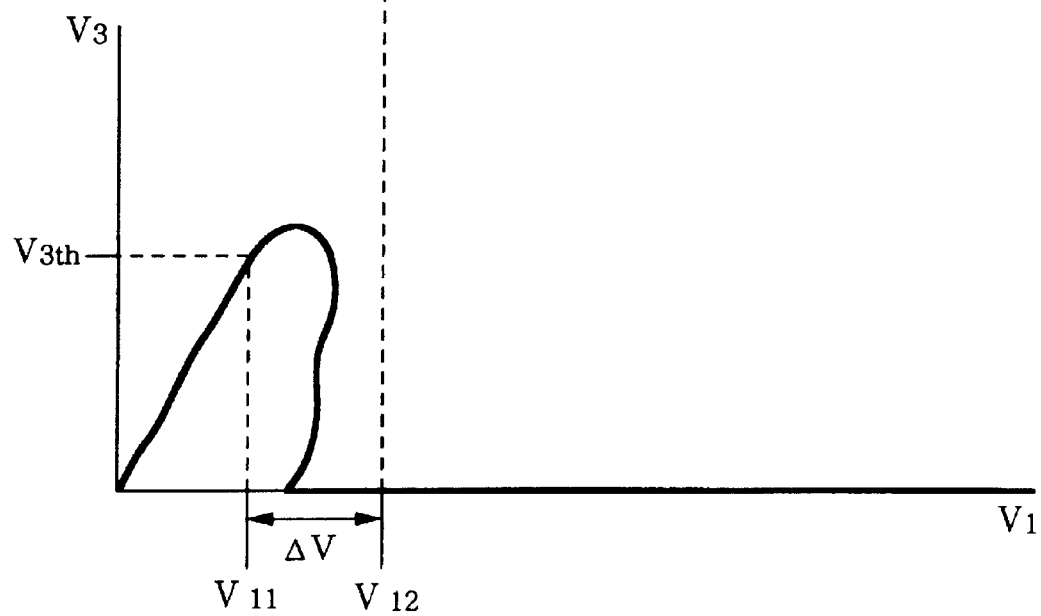
FIG. 7B is a graph to show values detected by the satellite sensors in the activation control apparatus of the occupant safety system according to the second embodiment.

Here the timing of $V_{12}$ to start the change of threshold is determined as follows. Namely, FIG. 6B shows the relationship of the operation value $V_1$ to the operation value $V_3$ based on the detection value G'(t) of the satellite sensors 30A, 30B upon the collision and FIG. 7B shows the relationship of the operation value $V_1$ to the operation value $V_3$ based on the detection value G'(t) of the satellite sensors 30A, 30B during running on rough roads and upon the under hit during running. The operation value $V_3$ is one computed according to the same equation as in the case of the first embodiment. In FIG. 6B and FIG. 7B, assuming that the operation value $V_1$ becomes $V_{11}$ when the operation value $V_3$ reaches the threshold $V_{3th}$, $V_{12}$ to start the change of threshold is defined as $V_{12}=V_{11}+\Delta V$.

As shown in FIG. 6A and FIG. 6B, the operation value $V_2$ starts rising with a lag behind the operation value $V_3$ upon the crash, but, as shown in FIG. 7A and FIG. 7B, the operation value $V_3$ and the operation value $V_2$ start rising approximately at the same time and fall at an early time during running on rough roads and upon the under hit during running. In the activation control apparatus of the occupant safety system according to the second embodiment, $\alpha'$ of Eq. 5 is thus set to be larger than $\alpha$ of Eq. 4, so that decrease amounts of the threshold $V_n$ in the range of $V_{11}<V_1<V_{12}$ can be smaller than those of the threshold $V_n$ in the range of $V_{12}<V_1$. This prevents the values (solid line 72) determined by the operation values $V_1$, $V_2$ based on the measurement value G(t) of the floor sensor 32 from exceeding the threshold $V'_n$ during running on rough roads and upon the under hit during running, as illustrated in FIG. 7A, and in turn prevents the oversensitive activation of the airbag system 36.

It can also be contemplated in the second embodiment described above that the decrease amounts of the threshold $V_n$ are made very small (approximately zero) in the range of $V_{11}<V_1<V_{12}$ by setting $\alpha'$ of Eq. 5 to a very large value. This setting can further enhance the effect of preventing the oversensitive activation of the airbag system 36.

Next described referring to FIG. 8A to FIG. 9B is the activation control apparatus of the occupant safety system according to the third embodiment of the present invention. The structure of this activation control apparatus of the occupant safety system is the same as that of the activation control apparatus of the occupant safety system according to the first embodiment (see FIG. 1 and FIG. 3), but the apparatus of the present embodiment is arranged to carry out such control as to alter the change start time of the threshold according to the crash type.

Figure 8A:
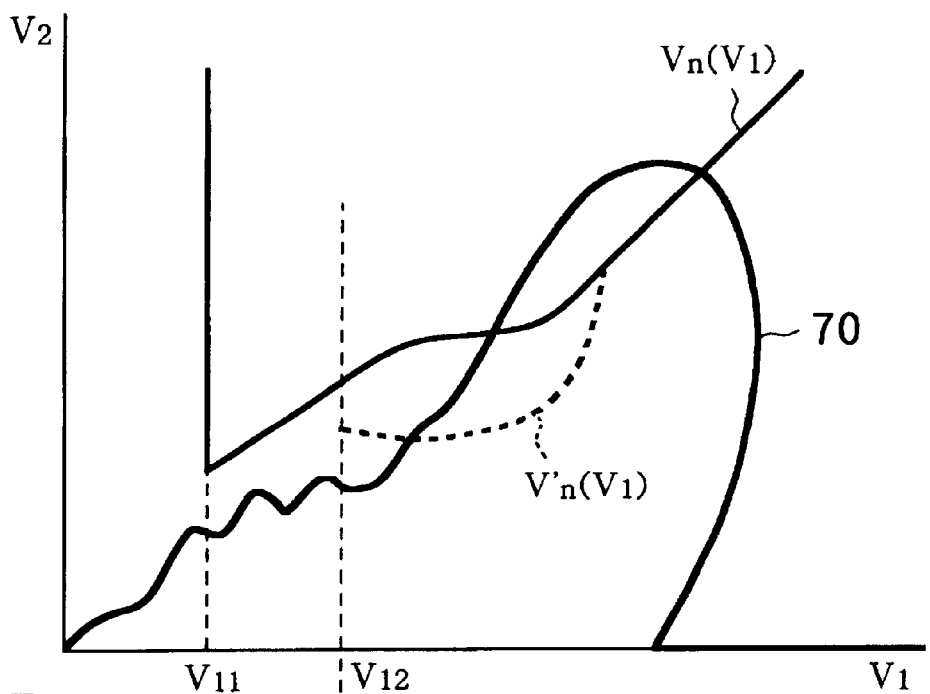
FIG. 8A is a diagram to show a determination map used in the activation control apparatus of the occupant safety system according to the third embodiment, and values detected upon collision by the floor sensors.
Figure 9A:
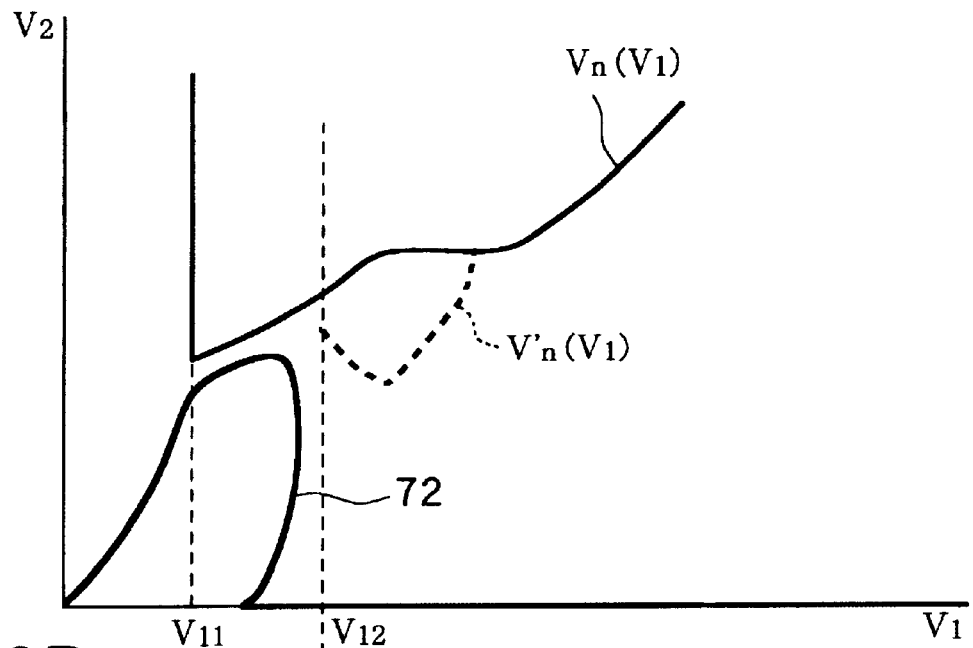
FIG. 9A is a diagram to show a determination map used in the activation control apparatus of the occupant safety system according to the third embodiment, and values detected during vehicle running on rough roads by the floor sensors.

FIG. 8A is a diagram to show the determination map having the threshold $V_n(V_1)$ stored in the threshold changer 42 and a solid line 70 thereon which represents the change in the value defined by the operation values $V_1$, $V_2$ based on the measurement value G(t) of the floor sensor 32 upon the collision. FIG. 9A is a diagram to show the determination map having the threshold $V_n(V_1)$ stored in the threshold changer 42 and a solid line 72 thereon which represents the change in the value defined by the operation values $V_1$, $V_2$ based on the measurement value G(t) of the floor sensor 32 during running on rough roads and upon the under hit during running. The operation values $V_1$ and $V_2$ are values computed according to the same equations as in the case of the first embodiment.

In this activation control apparatus of the occupant safety system according to the third embodiment, the threshold $V_n(V_1)$ is changed to the threshold $V'_n(V_1)$ according to Eq. 6 in the range of $V_{11}<V_1<V_{12}$. Namely, in this range the threshold $V'_n(V_1)$ is equal to the threshold $V_n(V_1)$, so that the threshold is subject to no change. In the range of $V_{12}<V_1$, the threshold $V_n(V_1)$ is changed to the threshold $V'_n(V_1)$ according to Eq. 7. Therefore, the change of the threshold $V_n(V_1)$ to the threshold $V'_n(V_1)$ is started from the time of $V_{12}$ as illustrated in FIG. 8A and FIG. 9A. The time of $V_{12}$ to start the change of the threshold is determined in a similar fashion to that in the case of the second embodiment.

$$V'_n(V_1) = V_n(V_1)[V_{11} < V_1 < V_{12}] \quad \text{(Eq. 6)}$$

$$V'_n(V_1) = V_n(V_1) - V_n(V_{11} + \Delta V)/\alpha[V_{12} < V_1] \quad \text{(Eq. 7)}$$

α: constant

Figure 8B:
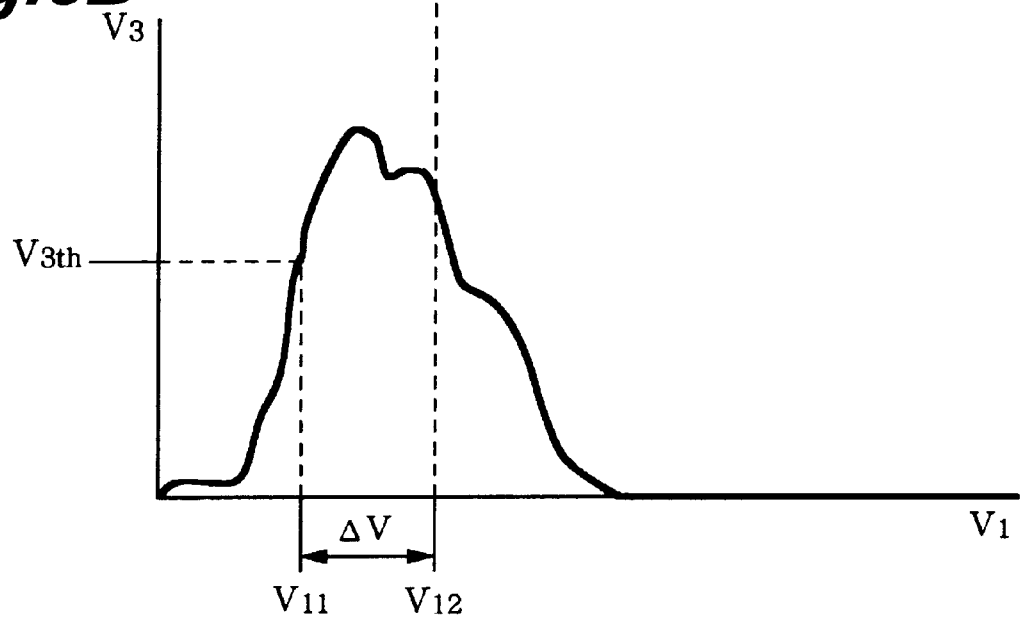
FIG. 8B is a graph to show values detected by the satellite sensors in the activation control apparatus of the occupant safety system according to the third embodiment.
Figure 9B:
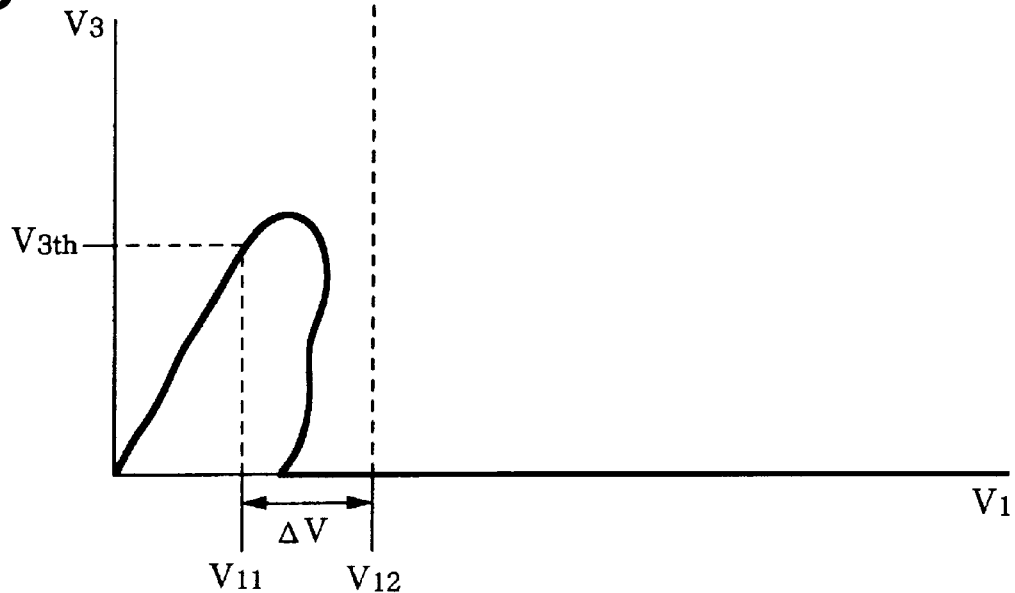
FIG. 9B is a graph to show values detected by the satellite sensors in the activation control apparatus of the occupant safety system according to the third embodiment.

As shown in FIG. 8A and FIG. 8B, the operation value $V_2$ starts rising with a lag behind the operation value $V_3$ upon the collision, but, as shown in FIG. 9A and FIG. 9B, the operation value $V_3$ and the operation value $V_2$ start rising approximately at the same time and they fall at an early time during running on rough roads and upon the under hit during running. Since this activation control apparatus of the occupant safety system according to the third embodiment is arranged to start the change of the threshold $V_n(V_1)$ to the threshold $V'_n(V_1)$ at the time of $V_{12}$, the values (solid line 72) defined by the operation values $V_1$, $V_2$ based on the measurement value G(t) of the floor sensor 32 are kept from exceeding the threshold $V'_n$ during running on rough roads and upon the under hit during running, as shown in FIG. 9A; this can prevent the oversensitive activation of the airbag system 36.

Figure 10A:
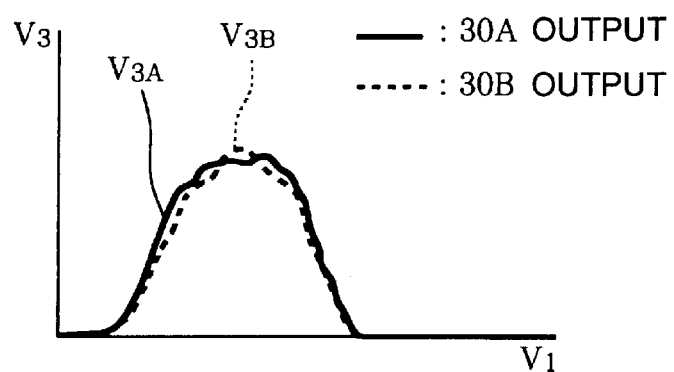
FIG. 10A is a diagram to show values detected by the satellite sensors in the activation control apparatus of the occupant safety system according to the fourth embodiment.
Figure 10B:
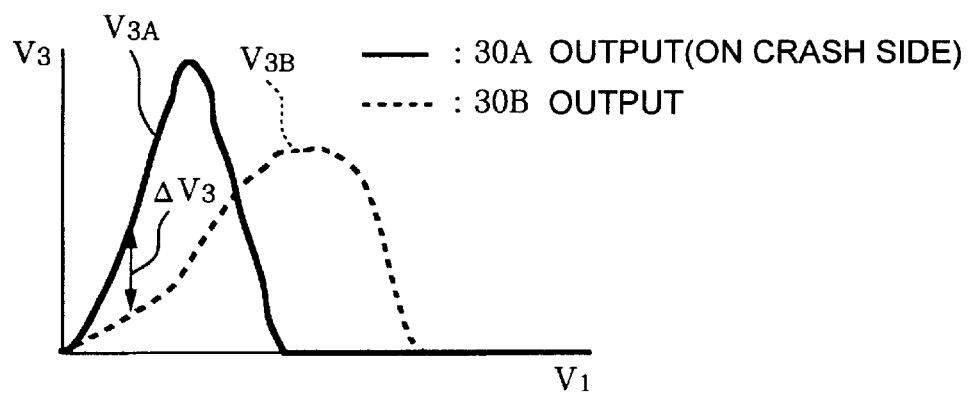
FIG. 10B is a diagram to show values detected by the satellite sensors in the activation control apparatus of the occupant safety system according to the fourth embodiment.

Next described referring to FIG. 10A and FIG. 10B is the activation control apparatus of the occupant safety system according to the fourth embodiment of the present invention. The structure of this activation control apparatus of the occupant safety system is the same as that of the activation control apparatus of the occupant safety system according to the first embodiment (see FIG. 1 and FIG. 3), but the apparatus of the present embodiment is arranged to carry out such control as to vary the change amounts of the threshold according to the crash type.

FIG. 10A shows the relationship of the operation value $V_1$ with the operation values $V_3$ based on the detection values G'(t) of the satellite sensors 30A, 30B upon a symmetric crash and FIG. 10B shows the relationship of the operation value $V_1$ with the operation values $V_3$ based on the detection values G'(t) of the satellite sensors 30A, 30B upon an asymmetric crash. The operation values $V_1$, $V_3$ are values computed according to the same equations as in the case of the first embodiment.

As shown in this FIG. 10A, waveforms are quite alike in the relationship between the operation value $V_{3A}$ based on the detection value G'(t) of the satellite sensor 30A and the operation value $V_{3B}$ based on the detection value G'(t) of the satellite sensor 30B upon the symmetric crash, but values are greater on the crash side in the relationship between the operation value $V_{3A}$ based on the detection value G'(t) of the satellite sensor 30A and the operation value $V_{3B}$ based on the detection value G'(t) of the satellite sensor 30B upon the asymmetric crash.

Therefore, when a difference $\Delta V_3$ between the operation values $V_{3A}$ and $V_{3B}$ exceeds a predetermined value, the greater out of the operation value $V_{3A}$ and the operation value $V_{3B}$ is employed as the operation value $V_3$ used for the change of threshold. Further, α of Eq. 4 for determining the change amount of the threshold is changed to a smaller value. This permits the airbag system 36 to be activated properly. When the difference $\Delta V_3$ between the operation values $V_{3A}$ and $V_{3B}$ does not exceed the predetermined value, an average of the operation value $V_{3A}$ and the operation value $V_{3B}$ or the greater is employed as the operation value $V_3$ used for the change of threshold.

Figure 11:
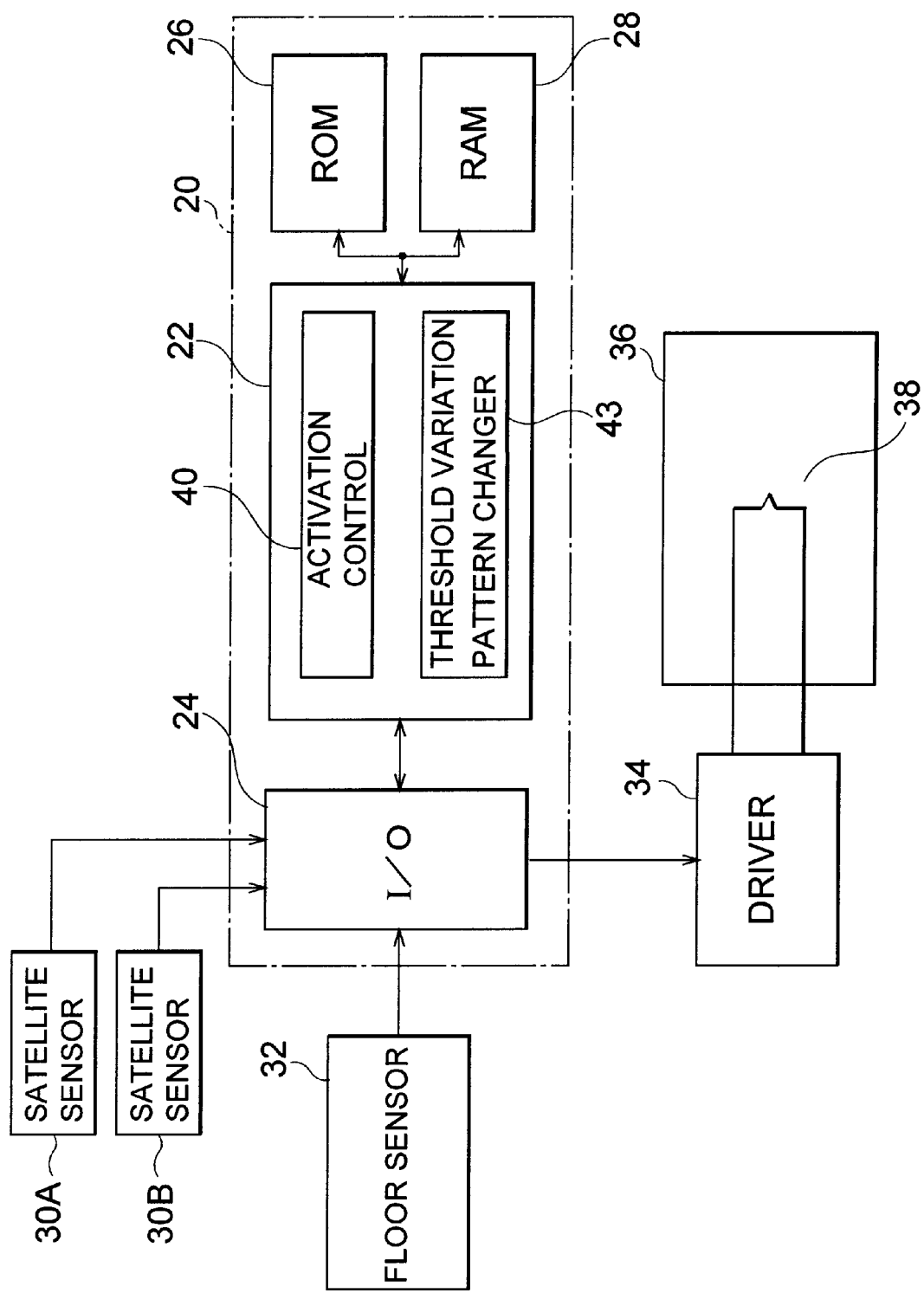
FIG. 11 is a block diagram to show the activation control apparatus of the occupant safety system according to the fifth embodiment.
Figure 12:
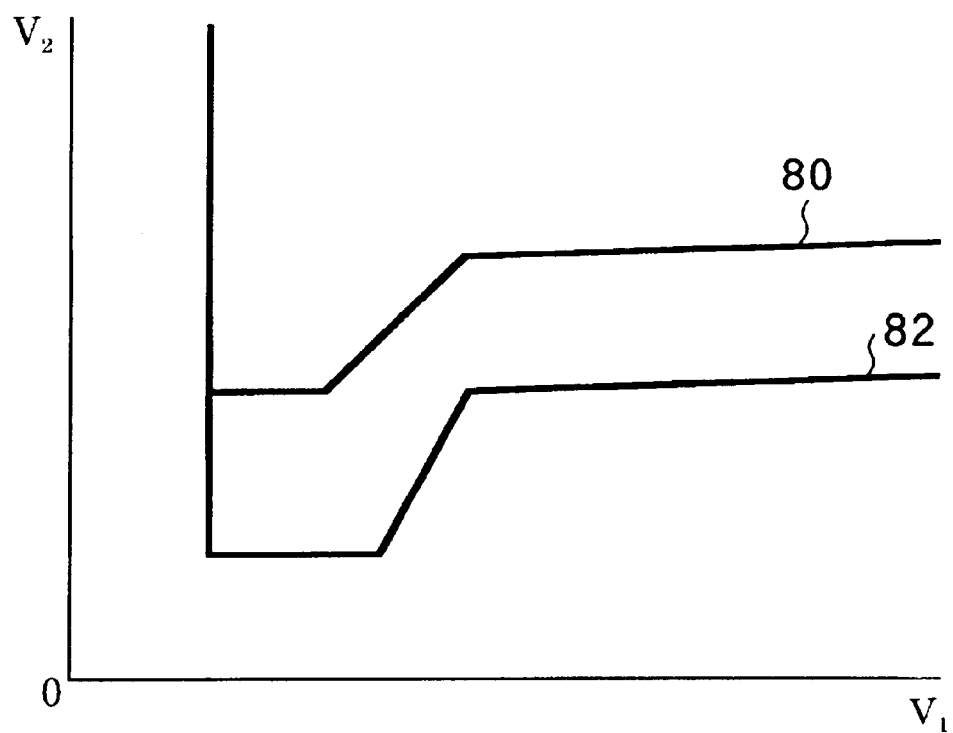
FIG. 12 is a diagram to show a determination map used in the activation control apparatus of the occupant safety system according to the fifth embodiment.

Next described referring to FIG. 11 and FIG. 12 is the activation control apparatus of the occupant safety system according to the fifth embodiment of the present invention. The structure of this activation control apparatus of the occupant safety system is one as illustrated in FIG. 11, in which a threshold variation pattern changer 43 replaces the threshold changer 42 in the activation control apparatus of the occupant safety system according to the first embodiment (see FIG. 1), and the threshold variation pattern changer 43 stores the determination map having the threshold 80 for the frontal crash and rough roads and the threshold 82 for the irregular crashes as shown in FIG. 12.

This activation control apparatus of the occupant safety system is arranged to compute an operation value (integrated value) VA based on the detection value G'(t) of the satellite sensor 30A and an operation value (integrated value) $V_B$ based on the detection value G'(t) of the satellite sensor 30B, to determine that the vehicle experienced an irregular crash when a difference $(V_A - V_B)$ between the operation value $V_A$ and the operation value $V_B$ and a ratio $(V_A/V_B)$ of the operation value $V_A$ to the operation value $V_B$ both exceed a predetermined value, and to switch the threshold of the determination map to the irregular crash threshold 82.

Therefore, the activation determining section 60 compares the value computed from the operation values $V_1$, $V_2$ based on the measurement value of the floor sensor 32 with the irregular crash threshold 82 and outputs an activation signal to the driving circuit 34 when the value computed from the operation values $V_1$, $V_2$ exceeds the irregular crash threshold 82. This causes the driving circuit 34 to energize the squib 38 in order to activate the airbag system 36, whereupon the squib 38 fires the gas generator (not illustrated). The operation values $V_1$, $V_2$ are values computed according to the same equations as in the case of the first embodiment.

Since this activation control apparatus of the occupant safety system according to the fifth embodiment is arranged to compute the operation value $V_A$ based on the detection value G'(t) of the satellite sensor 30A and the operation value $V_B$ based on the detection value G'(t) of the satellite sensor 30B and to determine that the vehicle experienced the irregular crash when both $(V_A - V_B)$ and $(V_A/V_B)$ exceed the predetermined value, the irregular crash of the vehicle can be determined accurately and the optimum activation control of the occupant safety system can be carried out depending upon the crash part of the vehicle and the crash type of the vehicle.

Although this activation control apparatus of the occupant safety system according to the fifth embodiment is arranged to compute the operation value $V_A$ based on the detection value G'(t) of the satellite sensor 30A and the operation value $V_B$ based on the detection value G'(t) of the satellite sensor 30B and to determine that the vehicle suffered the irregular crash when the both $(V_A - V_B)$ and $(V_A/V_B)$ exceed the predetermined value, the apparatus may also be modified so as to determine that the vehicle suffered the irregular crash when either one of $(V_A - V_B)$ and $(V_A/V_B)$ exceeds the predetermined value.

The activation control apparatus of the occupant safety system according to the fifth embodiment is arranged to carry out the activation judgment of the airbag system 36 by whether the value computed from the operation values $V_1$, $V_2$ based on the measurement value of the floor sensor 32 exceeds the threshold of the determination map, but the apparatus may also be modified so as to remove the floor sensor and carry out the activation judgment of the airbag system 36 by whether an operation value computed from the operation value $V_A$ based on the detection value G'(t) of the satellite sensor 30A and the operation value $V_B$ based on the detection value G'(t) of the satellite sensor 30B exceeds the threshold of the determination map.

Figure 13:
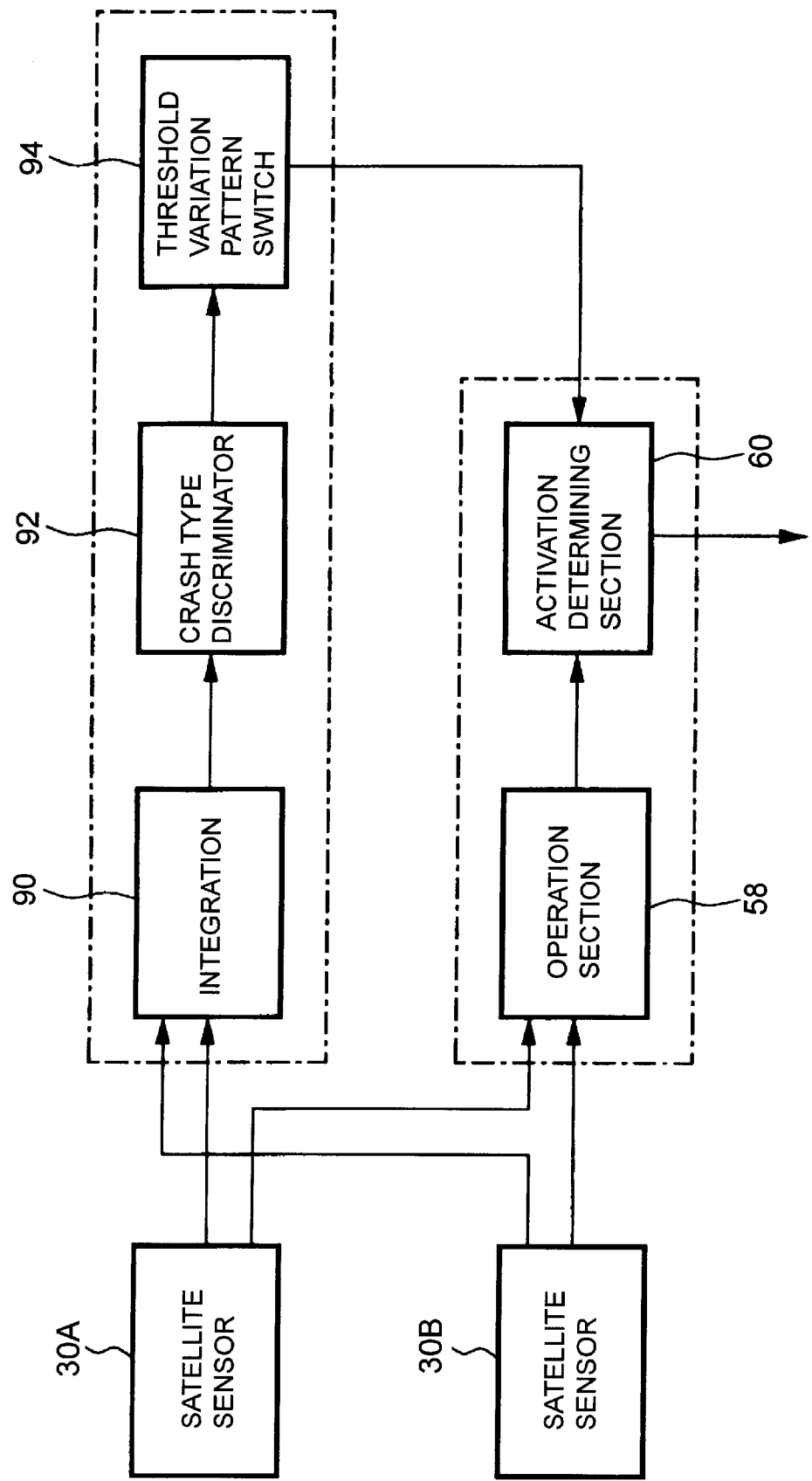
FIG. 13 is a block diagram to show a modification of the activation control apparatus of the occupant safety system according to the fifth embodiment.
Figure 14A:
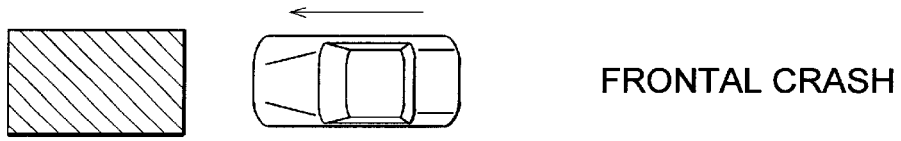
FIG. 14A is a diagram to show a state of frontal crash of a vehicle.
Figure 14B:
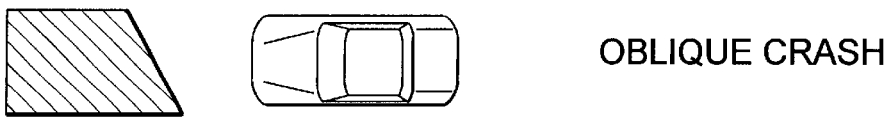
FIG. 14B is a diagram to show a state of oblique crash of a vehicle.
Figure 14C:
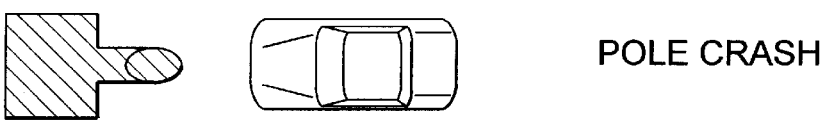
FIG. 14C is a diagram to show a state of pole crash of a vehicle.
Figure 14D:
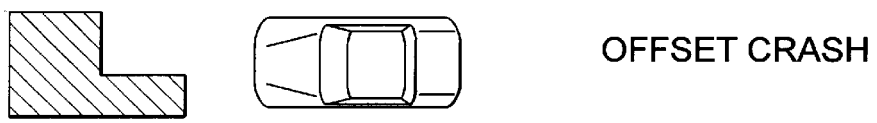
FIG. 14D is a diagram to show a state of offset crash of a vehicle.
Figure 14E:
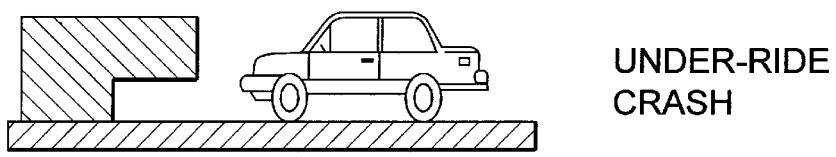
FIG. 14E is a diagram to show a state of underride crash of a vehicle.
Figure 14F:
FIG. 14F is a diagram to show a state in which a vehicle is running on a rough road.

In this case, as illustrated in FIG. 13, the values detected by the satellite sensors 30A, 30B are put into the operation section 58 and into an integration operation section 90. A crash type discriminating section 92 is arranged to determine the crash type based on an operation value in the integration operation section 90 and a threshold variation pattern switching section 94 switches the threshold of the determination map to the irregular crash threshold when it is determined that the vehicle suffered the irregular crash.

The operation section 58 is arranged to carry out a predetermined operation based on the detection values of the satellite sensors 30A, 30B, and a value of this operation is compared with the threshold of the determination map in the activation determining section 60. When the operation value is over the threshold, the activation determining section 60 outputs an activation signal of the airbag system.

This activation control apparatus of the occupant safety system according to the fifth embodiment is arranged to store the determination map having the threshold 80 for the frontal crash and rough roads and the irregular crash threshold 82 in the threshold variation pattern changer 43 and to effect switching between the threshold 80 for the frontal crash and rough roads and the irregular crash threshold 82, but, without having to be limited to this, the apparatus may also be modified so as to determine a decrease amount of the threshold according to the magnitude of difference between the operation value $V_A$ and the operation value $V_B$ and linearly lower the threshold 80 for the frontal crash and rough roads by the decrease amount.

According to the present invention, the occupant safety system can be activated at the optimum timing, because the threshold changing means changes the predetermined threshold used for the activation judgment of the occupant safety system in accordance with the value detected by the second sensor or because the threshold changing means changes the predetermined threshold used for the activation judgment of the occupant safety system by the predetermined amount according to the value detected by the second sensor.

The present invention can also prevent the oversensitive activation of the occupant safety system due to the impact etc. during running on rough roads, because the threshold change amount decreasing means decreases the change amount of the predetermined threshold corresponding to the initial increase state of the operation value based on the detection value of the first sensor.

According to the present invention, no change is made in the predetermined threshold corresponding to the initial increase state of the operation value based on the detection value of the first sensor when the operation value based on the detection value of the second sensor exceeds the predetermined value; therefore, the change start time of the predetermined threshold can be delayed and this can prevent the oversensitive activation of the occupant safety system due to the impact etc. during running on rough roads.

According to the present invention, the optimum activation control of the occupant safety system can be carried out according to the crash part of the vehicle, because the threshold changing means changes the predetermined threshold used for the activation judgment of the occupant safety system in accordance with the magnitude of the difference between the impacts detected by the right sensor and by the left sensor.

According to the present invention, the optimum activation control of the occupant safety system can be carried out according to the crash part of the vehicle, because the threshold changing means changes the predetermined threshold in accordance with the magnitude of the difference between the impacts detected by the right sensor and by the left sensor or the ratio of the impacts detected by the right sensor and by the left sensor.

INDUSTRIAL APPLICABILITY

The activation control apparatus of the occupant safety system according to the present invention is suitably applicable to the activation control apparatus of the airbag systems and the like.

What is claimed is:

1. An activation control apparatus of an occupant safety system comprising:
 a first sensor disposed at a predetermined position in a vehicle, for detecting a first detection value according to an impact on the vehicle;
 activation control means of the occupant safety system for activating the occupant safety system when a first operation value obtained based on the first detection value detected by said first sensor exceeds a predetermined threshold;
 a second sensor disposed more to the front than said first sensor in said vehicle, for detecting a second detection value of at least two different magnitudes according to a level of the impact on the vehicle; and
 threshold changing means for decreasing said predetermined threshold by a change amount according to the second detection value of said second sensor,
 wherein said threshold changing means comprises threshold change amount increasing means for increasing the change amount of said predetermined threshold with increase in a second operation value obtained based on the second detection value detected by said second sensor.

2. The activation control apparatus of the occupant safety system according to claim 1, wherein the value based on the detection value of said second sensor is a value resulting from integration of the detection value of said second sensor over a predetermined duration.

3. The activation control apparatus of the occupant safety system according to claim 1, wherein said threshold change amount increasing means is arranged to subtract a value based on an operation value resulting from integration of the detection value of said second sensor over a predetermined duration, from said predetermined threshold.

4. The activation control apparatus of the occupant safety system according to claim 1, wherein the operation value obtained based on the detection value of said first sensor is a value resulting from integration of the detection value of said first sensor over a predetermined duration.

5. The activation control apparatus of the occupant safety system according to claim 1, wherein said second sensor is comprised of two sensors and the greater of detection values detected by the two sensors is defined as the detection value of said second sensor.

6. The activation control apparatus of the occupant safety system according to claim 1, wherein said second sensor is disposed in a front center part of the vehicle.

7. The activation control apparatus of the occupant safety system according to claim 2, wherein said second sensor is arranged to detect levels of the impact on the vehicle and output detection values thereof as linear values.

8. The activation control apparatus of the occupant safety system according to claim 1, wherein said second sensor is a mechanical sensor which detects levels of the impact on the vehicle and which outputs detection values thereof as values of two different kinds.

9. The activation control apparatus of the occupant safety system according to claim 1, wherein said threshold changing means comprises threshold change amount decreasing means for decreasing the change amount of said predetermined threshold corresponding to an initial increase state of the operation value based on the detection value of said first sensor.

10. The activation control apparatus of the occupant safety system according to claim 1, wherein said threshold changing means is arranged not to change said predetermined threshold corresponding to an initial increase state of the operation value based on the detection value of said first sensor when the operation value based on the detection value of said second sensor exceeds a predetermined value.

11. The activation control apparatus of the occupant safety system according to claim 1, wherein said second sensor comprises a right sensor and a left sensor placed right and left in the front part of said vehicle and said threshold changing means changes said predetermined threshold in accordance with magnitude of a difference between impacts detected by said right sensor and by said left sensor.

12. The activation control apparatus of the occupant safety system according to claim 1, wherein said second sensor comprises a right sensor and a left sensor placed right and left in the front part of said vehicle and said threshold changing means changes said predetermined threshold in accordance with magnitude of a difference between impacts detected by said right sensor and by said left sensor or a ratio of the impacts detected by said right sensor and by said left sensor.

* * * * *